United States Patent
Lin et al.

(10) Patent No.: US 11,462,181 B2
(45) Date of Patent: Oct. 4, 2022

(54) ELECTROPHORETIC DISPLAY, AND METHOD FOR DRIVING SAME

(71) Applicant: JADARD TECHNOLOGY INC., Shenzhen (CN)

(72) Inventors: Lieh-Chiu Lin, Shenzhen (CN); Chung-Kuang Lee, Shenzhen (CN); Yan You, Shenzhen (CN)

(73) Assignee: JADARD TECHNOLOGY INC., Shenzhen (CN)

( * ) Notice: Subject to any disclaimer, the term of this patent is extended or adjusted under 35 U.S.C. 154(b) by 8 days.

(21) Appl. No.: 17/327,188

(22) Filed: May 21, 2021

(65) Prior Publication Data

US 2022/0238077 A1 Jul. 28, 2022

(30) Foreign Application Priority Data

Jan. 26, 2021 (CN) .......................... 202110104848.9

(51) Int. Cl.
*G09G 3/34* (2006.01)
*G02F 1/167* (2019.01)

(52) U.S. Cl.
CPC .............. *G09G 3/344* (2013.01); *G02F 1/167* (2013.01); *G09G 2310/068* (2013.01); *G09G 2310/08* (2013.01)

(58) Field of Classification Search
CPC . G09G 3/344; G09G 3/3446; G09G 2310/068
See application file for complete search history.

(56) References Cited

U.S. PATENT DOCUMENTS

| | | | |
|---|---|---|---|
| 2010/0149158 A1 | 6/2010 | Lee | |
| 2011/0286076 A1* | 11/2011 | Lin | ...................... G09G 3/3446 359/296 |
| 2014/0266998 A1* | 9/2014 | Ogawa | ................. G09G 3/2003 345/107 |
| 2015/0221244 A1* | 8/2015 | Miller | ..................... G09F 9/301 705/310 |
| 2016/0301785 A1* | 10/2016 | Espinoza | .......... H04M 1/72463 |
| 2017/0293195 A1* | 10/2017 | Yamazaki | .............. G09G 3/344 |
| 2019/0213959 A1* | 7/2019 | Lin | .......................... G02F 1/167 |
| 2021/0142740 A1 | 5/2021 | Gao et al. | |

FOREIGN PATENT DOCUMENTS

CN   110780505   2/2020

* cited by examiner

*Primary Examiner* — Priyank J Shah
(74) *Attorney, Agent, or Firm* — ScienBiziP, P.C.

(57) ABSTRACT

An electrophoretic display able to operate on a reduced power supply includes a display panel and a driving circuit electrically connected to the display panel. The display panel includes a plurality of first electrophoretic particles and a plurality of second electrophoretic particles. The driving circuit is configured to provide a balance signal to the display panel during a balance period, provide a mixed signal to the display panel during a mixing period, and provide a driving signal to the display panel during a coloring period. The balance period, the mixing period, and the coloring period are sequential in time, and a preset time interval is between each of the periods.

16 Claims, 6 Drawing Sheets

ELECTROPHORETIC DISPLAY, AND METHOD FOR DRIVING SAME

FIELD

The subject matter herein generally relates to displays, specifically an electrophoretic display, and a method for driving the electrophoretic display.

BACKGROUND

In electrophoretic displays, a distribution of charged particles is controlled by electric fields, thereby changing a reflectivity of display area to ambient light for display. However, conventional electrophoretic displays have high power consumption.

Therefore, there is room for improvement in the art.

BRIEF DESCRIPTION OF THE DRAWINGS

Implementations of the present disclosure will now be described, by way of embodiment, with reference to the attached figures.

DETAILED DESCRIPTION

Figure 1:
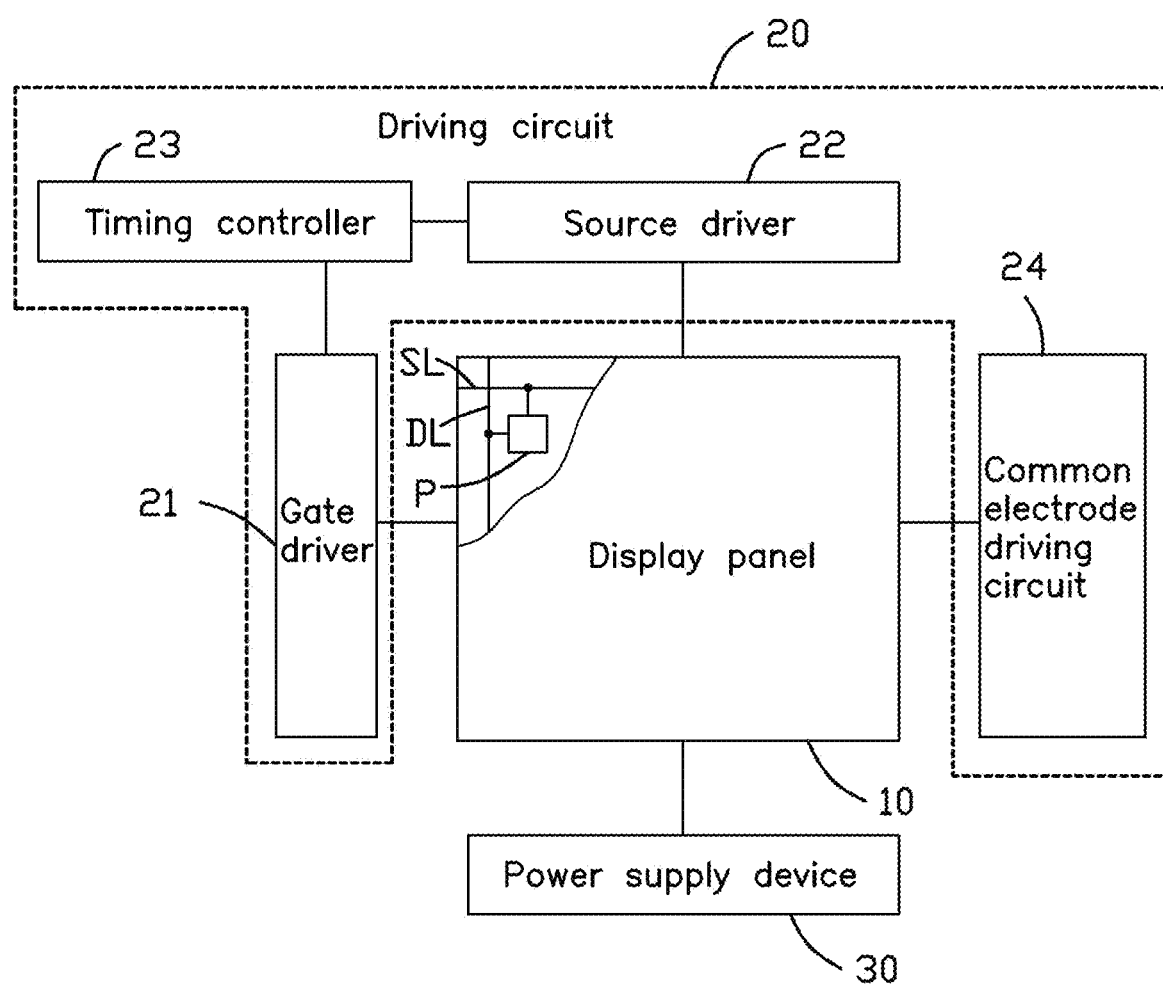
FIG. 1 is a schematic diagram of an electrophoretic display according to an embodiment.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present disclosure.

The term "comprising" when utilized, means "including, but not necessarily limited to"; it specifically indicates open-ended inclusion or membership in the so-described combination, group, series, and the like. The disclosure is illustrated by way of example and not by way of limitation in the figures of the accompanying drawings in which like references indicate similar elements. It should be noted that references to "an" or "one" embodiment in this disclosure are not necessarily to the same embodiment, and such references can mean "at least one".

FIG. 1 shows an electrophoretic display 100 according to an embodiment. The electrophoretic display 100 includes a display panel 10, a driving circuit 20 electrically connected to the display panel 10, and a power supply device 30 electrically connected to the display panel 10. The power supply device 30 is configured to provide power to the display panel 10. The display panel 10 includes a plurality of first electrophoretic particles 131 (shown in FIG. 2) and a plurality of second electrophoretic particles 132 (shown in FIG. 2). The driving circuit 20 is configured to provide a balance signal to the display panel 10 during a balance period to balance residual charges accumulated in the display panel 10 and a mixed signal is provided to the display panel 10 during a mixing period, so that the first and second electrophoretic particles 131 and 132 are uniformly dispersed. Then a coloring period is applied, wherein a driving signal is provided to the display panel 10 to drive the plurality of first electrophoretic particles 131 to the display side of the display panel 10. The balance period, the mixing period, and the coloring period are sequential in time, and a preset time interval is set for switching from one period to another.

In the electrophoretic display 100, the driving circuit 20 is configured to drive the display panel 10 in a segmented manner to switch between periods. That is, a preset time interval is between the balance period and the mixing period, between the mixing period and the coloring period, and between the coloring period and the balance period. The balance signal, the mixed signal, and the driving signal are output to the display panel 10 non-continuously and non-segmentally. Since power output for each period (such as balance period, mixing period, and coloring period) is segmentally reduced, less driving power is required, and a total power consumption is reduced.

The display panel 10 includes a plurality of scan lines SL (only one is shown in FIG. 1), a plurality of data lines DL (only one is shown in FIG. 1), and a plurality of pixels P (only one is shown in FIG. 1). Each scan line SL is substantially perpendicular to every data line DL. The pixels P are arranged in a matrix. Each pixel P is electrically connected to one scan line SL and one data line DL.

The driving circuit 20 includes a gate driver 21, a source driver 22, and a timing controller 23. The timing controller 23 is electrically connected to the gate driver 21 and the source driver 22. The timing controller 23 controls the gate driver 21 to sequentially turn on each pixel P and outputs data signals to the source driver 22. The data signals include the balanced signals, the mixed signals, and the driving signals. The gate driver 21 is electrically connected to the scan lines SL and the timing controller 23. The gate driver 21 sequentially turns on each pixel P under the control of the timing controller 23. The source driver 22 is electrically connected to the data lines DL and the timing controller 23. The source driver 22 applies the data signals to the pixels P when turned on by the gate driver 21 under the control of the timing controller 23.

Figure 2:
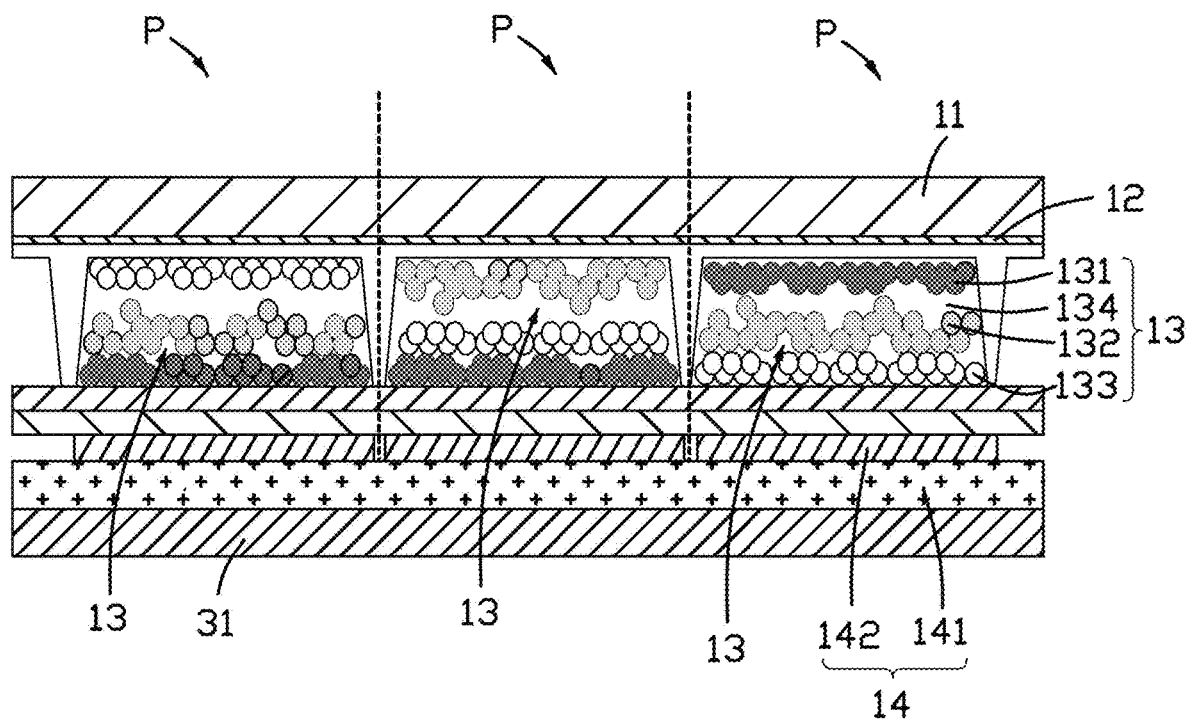
FIG. 2 is a cross-sectional view of part of the display panel in FIG. 1.

As shown in FIG. 2, the display panel 10 includes a first substrate 11 and a driving substrate 14 opposite to the first substrate 11. A plurality of electrophoretic units 13 is between the first substrate 11 and the driving substrate 14. Each pixel P corresponds to one electrophoretic unit 13. Each electrophoretic unit 13 includes an electrophoretic solution 134 and electrophoretic particles in the electrophoretic solution 134. A surface of the first substrate 11 adjacent to the driving substrate 14 is provided with a common electrode layer 12. The driving substrate 14 includes a second substrate 141 and a plurality of pixel electrodes 142 spaced apart from each other on the second substrate 141. Each pixel electrode 142 corresponds to one electrophoretic unit 13.

The driving substrate 14 may be a thin film transistor array substrate. A material of the first substrate 11 may be, but is not limited to, polyethylene terephthalate (PET). A material of the second substrate 141 may be, but is not limited to, glass. A material of the common electrode layer 12 and the pixel electrode 142 may be, but is not limited to, indium tin oxide (ITO).

As shown in FIG. 1, the driving circuit 20 includes a common electrode driving circuit 24. The common electrode driving circuit 24 is electrically connected to the display panel 10 and the timing controller 23. The common electrode driving circuit 24 provides common voltages (e.g., a universal voltage) to the common electrode layer 12 of the display panel 10 under the control of the timing controller 23.

The timing controller 23 has a built-in look-up table about the data signals and common voltages that need to be applied for illumination of different pixels P. By receiving the signal in the lookup table, the timing controller 23 controls the common electrode driving circuit 24 to apply the common voltages to the common electrode layer 12, controls the gate driver 21 to sequentially turn on each pixel P of the display panel 10, and controls the source driver 22 to apply data signals to the pixels P that are turned on. The electrophoretic particles move in the electrophoretic solution 134 under the control of the common voltages and the data signals (e.g., data voltages), so that images appear to a viewer.

In one embodiment, the electrophoretic display 100 is a color electrophoretic display. Each electrophoretic unit 13 includes electrophoretic particles of at least three colors. The driving circuit 20 is electrically connected to the driving substrate 14 to move the electrophoretic particles by applying a voltage, so that each pixel P in the display panel 10 can appear black, white, grayscale, or specific colors.

In FIG. 2, each electrophoretic unit 13 has a microscopic cup structure and has electrophoretic particles of three colors (i.e., black electrophoretic particles, white electrophoretic particles, and color electrophoretic particles). The color electrophoretic particles can be, but are not limited to, red and yellow electrophoretic particles. In other embodiments, each electrophoretic unit 13 may have other types of structures, such as a microcapsule structure.

In FIG. 2, the first, second, and third electrophoretic particles 131, 132, and 133 include black electrophoretic particles, white electrophoretic particles, and red and yellow electrophoretic particles. That is, among the first, second, and third electrophoretic particles 131, 132, and 133, one type is a black electrophoretic particle, another type is a white electrophoretic particle, and the last type is either red or yellow electrophoretic particle. In other embodiments, the electrophoretic units 13 in the display panel 10 may include only black electrophoretic particles and white electrophoretic particles instead of color electrophoretic particles. Each pixel P in the display panel 10 may display black, white, and gray scales.

Since the electrophoretic display 100 adopts segmented image brushing for image display, each driving period (e.g., balance period, mixing period, and coloring period) can be started with a small amount of power, which reduces power consumption and saves power. Therefore, the power supply device 30 can be an energy-storing structure instead of a common battery (e.g., a lithium battery). Thereby, the electrophoretic display 100 can be light and thin. In addition, providing power from a lithium battery prolongs the service life of the electrophoretic display 100.

In one embodiment, the power supply device 30 includes a wireless control chip, and the wireless control chip enables an external power source to provide power wirelessly to the display panel 10. The electrophoretic display 100 includes a circuit board (not shown) electrically connected to the display panel 10, and the wireless control chip may be arranged on the circuit board. Since the wireless control chip generates power to the electrophoretic display 100, no battery (such as lithium battery) is required, so that a volume of the electrophoretic display 100 can be reduced even further and the service life of the electrophoretic display 100 can be further prolonged.

In some embodiments, the power supply device 30 includes a solar cell 31. The solar cell 31 is configured to convert light energy of ambient light into electrical energy to provide power to the display panel 10. As shown in FIG. 2, the solar cell 31 is on the side of the driving substrate 14 away from the first substrate 11. The solar cell 31 may be provided on the circuit board.

In some embodiments, the electrophoretic display 100 includes both the solar cell 31 and the wireless control chip. That is, the electrophoretic display 100 can be powered by the solar cell 31, or the external power source can wirelessly charge the wireless control chip. Since the solar cell 31 converts ambient light into electrical energy required by the electrophoretic display 100, and can store or reuse the electrical energy, the use of external power for the electrophoretic display 100 is not required or is reduced. The electrophoretic display 100 has the characteristics of energy storage, energy saving, and power saving.

In an embodiment, the solar cell 31 may be, but is not limited to an organic solar cell, a polycrystalline silicon solar cell, a microcrystalline silicon solar cell, or a copper indium gallium selenium solar cell.

Figure 3:
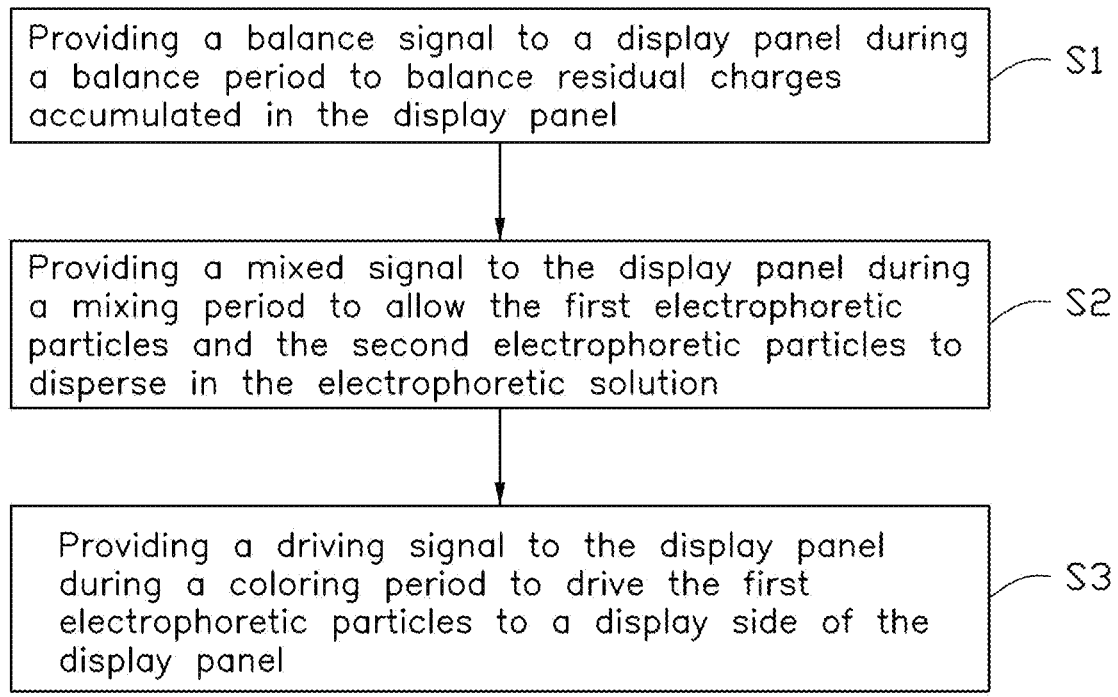
FIG. 3 is a flow chart of a method for driving the electrophoretic display in FIG. 1.

FIG. 3 shows a flowchart of a method for driving an electrophoretic display according to an embodiment. The example method is provided by way of example, as there are a variety of ways to carry out the method. The method described below can be carried out using the configurations illustrated in FIG. 3, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added, or fewer blocks can be utilized, without departing from this disclosure. The example method can begin at block S1.

Block S1: During a balance period, a balance signal is provided to the display panel to balance residual charges accumulated in the display panel.

Block S2: During a mixing period, a mixed signal is provided to the display panel to allow the first electrophoretic particles and the second electrophoretic particles to disperse in the electrophoretic solution.

Block S3: During a coloring period, a driving signal is provided to the display panel to drive the first electrophoretic particles to a display side of the display panel.

The balance period, the mixing period, and the coloring period are sequential in time, and a preset time interval is between at least one of adjacent the balance period and the mixing period, and adjacent the mixing period and the coloring period.

Hereinafter, the display panel includes electrophoretic particles of three colors. The first electrophoretic particles 131 are positively charged color electrophoretic particles (e.g., red charged particles), the second electrophoretic particles 132 are positively charged black electrophoretic particles, and the third electrophoretic particles 133 are negatively charged white electrophoretic particles. A charged amount of the colored electrophoretic particles is lower than that of the black electrophoretic particles. That is, when a negative voltage (e.g., −V1) is applied to the driving substrate 14, the negatively charged white electrophoretic particles move in the electrophoresis units 13 toward the display side of the display panel 10. The display side is defined as a side of the first substrate 11 away from the driving substrate 14. When a high positive voltage (e.g., +V1) is applied to the driving substrate 14, the positively charged black electrophoretic particles move in the electrophoretic units 13 toward the display side of the display panel 10. When a low positive voltage (e.g., +V2, V2 is less than V1) is applied to the driving substrate 14, the positively charged color electrophoretic particles move toward the display side of the display panel 10 in the electrophoretic units 13. A moving speed of each the black electrophoretic particle and the color electrophoretic particle is determined according to a magnitude of the positive voltage applied by the driving substrate 14.

In one embodiment, the driving circuit 20 provides data signals to the driving substrate 14 in three periods to display an image. A preset time interval is between at least one of adjacent the balance period and the mixing period, and adjacent the mixing period and the coloring period. That is, the driving of the data signal includes a balance period, a mixing period, and a coloring period in time sequence. The preset time interval may be between adjacent the balance period and the mixing period, or between adjacent the mixing period and the coloring period, or between both adjacent the balance period and the mixing period and between adjacent the mixing period and the coloring period. The driving method will be described below with reference to FIGS. 4 through 6 by taking the driving of the color electrophoretic particles to the display side of the display panel 10 as an example.

Figure 4:
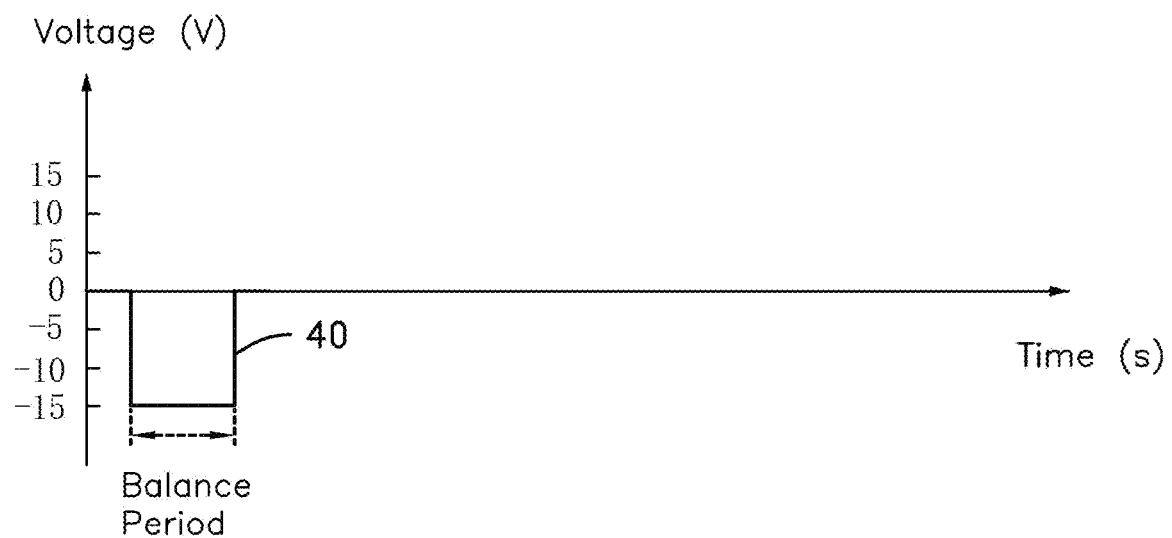
FIG. 4 is a view showing a balance signal for driving the electrophoretic display, as in Block S1 of the method of FIG. 3.

As shown in FIG. 4, during the balance period, the drive circuit 20 provides a balance signal to the driving substrate 14 to balance the residual charges accumulated in the display panel 10 and eliminate the accumulated charges on the electrophoretic particles, so that each electrophoretic particle in the electrophoretic units 13 is in an electrically neutralized state. The common electrode driving circuit 24 applies a constant voltage to the common electrode layer 12, and the source driver 22 applies a balanced signal to the pixel electrodes 142 through the data lines DL, so that there is a voltage difference between the common electrode layer 12 and the pixel electrodes 142. In FIG. 4, the balanced signal is a square wave signal 40, and the square wave signal 40 is a voltage signal of −15V with a certain length of time.

In one embodiment, after the balance period and the preset time interval, the driving circuit 20 applies the mixed signal to the driving substrate 14. The preset time interval can be a few minutes, a few hours, or even a day, which is not limited, and it can be defined by the user.

Figure 5:
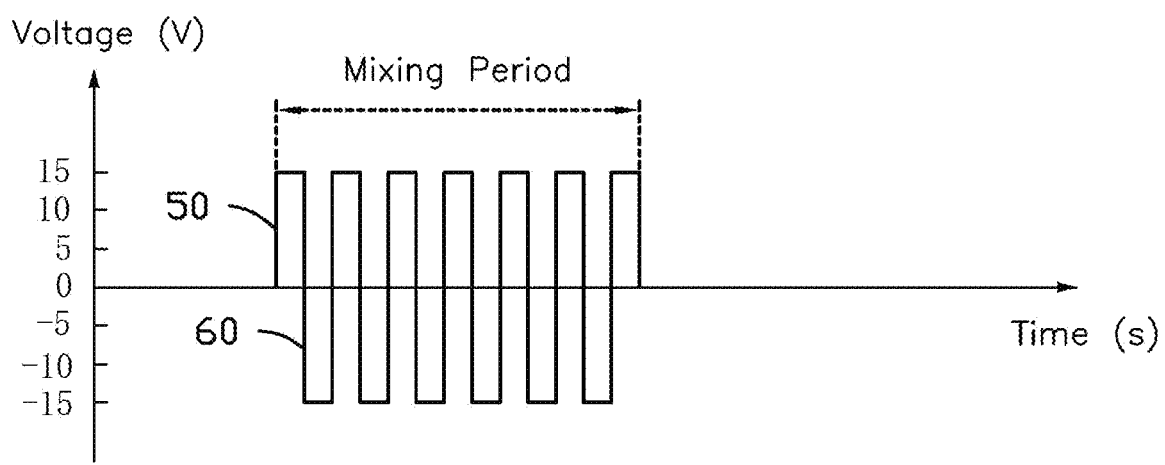
FIG. 5 is a view showing a mixed signal for driving the electrophoretic display, as in Block S2 of the method of FIG. 3.

After the preset time interval, as shown in FIG. 5, during the mixing period, the driving circuit 20 provides the mixed signal to the display panel 10 so that the electrophoretic particles in the electrophoretic unit 13 are uniformly dispersed.

In some embodiments, the electrophoretic display 100 includes electrophoretic particles of two colors. In block S2, the mixed signal is used to drive the electrophoretic particles of the two colors to be uniformly dispersed.

In some embodiments, the electrophoretic display 100 includes electrophoretic particles of more than three colors. In n step S2, the mixed signal is used to drive the electrophoretic particles of more than three colors to be uniformly dispersed.

In FIG. 5, the mixed signal includes a plurality of positive pulse signals 50 and a plurality of negative pulse signals 60 arranged in a staggered manner. Each of the positive pulse signals 50 alternates with one of the negative pulse signals 60. The positive pulse signals 50 are used to drive the black electrophoretic particles and the color electrophoretic particles. The negative pulse signals 60 are used to drive the white electrophoretic particles. An amplitude of each positive pulse signal 50 is equal to an amplitude of each negative pulse signal 60. Each positive pulse signal 50 is, for example, a positive voltage signal of 15V. Each negative pulse signal 60 is, for example, a negative voltage signal of 15V.

In one embodiment, after the mixing period and the preset time interval, the driving circuit 20 applies the driving signal to the driving substrate 14. The preset time interval can be a few seconds, a few minutes, a few hours, or even a day, which is not limited, and it can be defined by the user.

Figure 6:
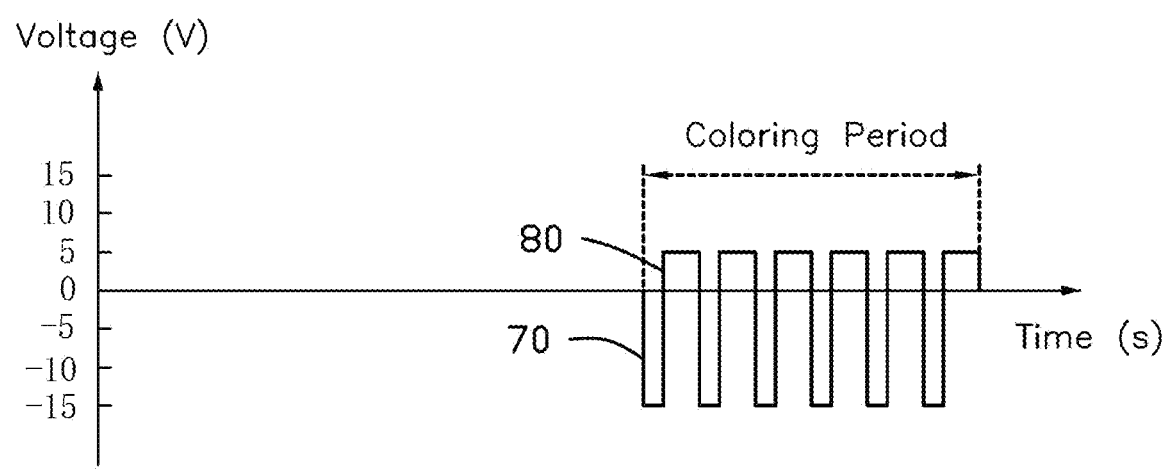
FIG. 6 is a view showing a driving signal for driving the electrophoretic display, as in Block S3 of the method of FIG. 3.

After the preset time interval, as shown in FIG. 6, during the coloring period, the driving signal is provided to the display panel 10 to drive the color electrophoretic particles to the display side of the display panel 10. In FIG. 6, the driving signal includes a plurality of first driving pulses 70 and a plurality of second driving pulses 80 arranged in a staggered manner. Each of the first driving pulses 70 alternates with one of the second driving pulses 80. The first driving pulses 70 are used to drive the white electrophoretic particles to a specific position, and the second driving pulses 80 are used to drive the color electrophoretic particles to move to the display side of the display panel 10 in the electrophoretic unit 13. Each first driving pulse 70 is, for example, a negative voltage signal of 15V, and each second driving pulse 80 is, for example, a positive voltage signal of 5V. The driving circuit 20 first applies a 15V negative voltage signal of 15V to the driving substrate 14 to drive the white electrophoretic particles to move to a specific position, and then applies a positive voltage signal of 5V to the driving substrate 14 to drive the color electrophoretic particles to the display side of the display panel 10. In this way, the first driving pulses 70 and the second driving pulses 80 are output cyclically. When the coloring period ends, the image to be displayed is completely displayed.

In other embodiments, the voltage amplitude and time length of the driving pulse of the balanced signal, the mixed signal, and the driving signal may be determined according to the characteristics of different electrophoretic particles.

In one embodiment, when the image to be displayed is a red image, a duration of each the balance period, the mixing period, and the coloring period is 1.83 s, 6.33 s, and 8.08 s, respectively. A starting current of each the balance period, the mixing period, and the coloring period is 21.64 mA, 22.12 mA, 22.4 mA, respectively. An average current of each the balance period, the mixing period, and the coloring period is 1.37 mA, 1.5 mA, 1.3 mA, respectively. That is, in order to display the red image, approximately 20 mJ of power consumption is required. Among optical values, a brightness L is 30.84, a color saturation a is 41.42, and a color saturation b is 27.92 (i.e., relatively pure red). When the image to be displayed is a white image, the duration of each the balance period, mixing period, and coloring period is 1.83 s, 6.33 s, and 8.07 s, respectively. The starting current of each the balance period, the mixing period, and the coloring period is 21.2 mA, 21.08 mA, 24.12 mA, respectively. The average current of each the balance period, the mixing period, and the coloring period is 1 mA, 1.48 mA, 1.04 mA. That is, in order to display the white image, approximately 20 mJ of power consumption is required. Among the optical values, the brightness L is 67.54, the color saturation a is −1.59, and the color saturation b is 0.84 (i.e., relatively pure white). When the image to be displayed is a black image, the duration of each the balance period, mixing period, and coloring period is 1.83 s, 6.33 s, and 8.07 s, respectively. The starting current of each the balance period, the mixing period, and the coloring period is 19.68 mA, 21.6 mA, 21.5 mA. The average current of each the balance period, the mixing period, and the coloring period is 1.41 mA, 1.59 mA, 1.08 mA, respectively. That is, in order to display the black image, approximately 20 mJ of power consumption is required. Among the optical values, the brightness L is 12.01, the color saturation a is 1.61, and the color saturation b is −3.48 (i.e., relatively pure black).

Therefore, the driving method adopts segmented image brushing, and each segmented image brushing requires a small amount of power (about 20 mJ), and the optical characteristics of the displayed image are not affected. The one-step brushing (or non-segmented brushing) method requires a one-time output of three periods of balance, mixing and coloring, and the required power consumption is as high as 66.1 mJ. Therefore, the driving method of the embodiment of the present disclosure can not only maintain good optical characteristics, but also reduce the power consumption of each image refreshing.

In one embodiment, the electrophoretic display 100 is an electronic shelf label, which is used to display information of a commodity to be sold (for example, picture, price, two-dimensional code, etc. of the commodity to be sold). For example, the electrophoretic display 100 needs to display the information of a first type of commodity (e.g., a mobile phone) for sale on the first day and needs to display the information of a second type of commodity (e.g., clothes) for sale on the second day. The salesperson can make the electrophoretic display 100 complete the balance period and the mixing period when off work on the first day, and set a time interval (i.e., the preset time interval) so that the electrophoretic display 100 completes the coloring period and displays the information of the second type of when it is open for business the next day. That is, the display screen of the electrophoretic display 100 is chaotic after work on the first day and before business starts on the second day, and the information of the second type of commodity to be sold has not been completely displayed. When the business starts the next day, the electrophoretic display 100 completes the coloring period, and the displayed information is updated to the information of the second type of commodity for sale. In other embodiments, the electrophoretic display 100 may be an electronic reader, electronic paper, and so on.

Since the electrophoretic display 100 adopts a segmented brushing manner to display images, it has the advantages of, saving power, small size, and long service life.

It is to be understood, even though information and advantages of the present exemplary embodiments have been set forth in the foregoing description, together with details of the structures and functions of the present exemplary embodiments, the disclosure is illustrative only. Changes may be made in detail, especially in matters of shape, size, and arrangement of parts within the principles of the present exemplary embodiments to the full extent indicated by the plain meaning of the terms in which the appended claims are expressed.

What is claimed is:

1. An electrophoretic display, comprising:
   a display panel comprising an electrophoretic solution, a plurality of first electrophoretic particles, and a plurality of second electrophoretic particles, the plurality of first electrophoretic particles and the plurality of second electrophoretic particles having different colors and being in the electrophoretic solution; and
   a driving circuit electrically connected to the display panel;
   wherein the driving circuit is configured to:
      provide a balance signal to the display panel during a balance period to balance residual charges accumulated in the display panel;
      provide a mixed signal to the display panel during a mixing period to allow the plurality of first electrophoretic particles and the plurality of second electrophoretic particles to disperse in the electrophoretic solution;
      provide a driving signal to the display panel during a coloring period to drive the plurality of first electrophoretic particles to a display side of the display panel;
   wherein the balance period, the mixing period, and the coloring period are sequential in time, a preset time interval is between the balance period and the mixing period, or between the mixing period and the coloring period, or between the balance period and the mixing period and between the mixing period and the coloring period, and the driving circuit is further configured to drive the display panel in a segmented image brushing manner and is restarted after the preset time interval to switch from one period to another.

2. The electrophoretic display of claim 1, wherein the display panel comprises a first substrate and a driving substrate opposite to the first substrate, the plurality of first electrophoretic particles and the plurality of second electrophoretic particles are between the first substrate and the drive substrate, and the driving circuit is electrically connected to the driving substrate to drive the display panel through the driving substrate.

3. The electrophoretic display of claim 2, wherein the driving substrate comprises a second substrate and a plurality of pixel electrodes spaced apart from each other on the second substrate.

4. The electrophoretic display of claim 2, further comprising a power supply device electrically connected to the display panel for providing power to the display panel.

5. The electrophoretic display of claim 4, wherein the power supply device comprises a wireless control chip, and the wireless control chip is configured to enable an external power source to provide power wirelessly to the display panel.

6. The electrophoretic display of claim 4, wherein the power supply device comprises a solar cell, and the solar cell is configured to convert light energy into electrical energy to provide power to the display panel.

7. The electrophoretic display of claim 6, wherein the solar cell is on a side of the driving substrate away from the first substrate.

8. The electrophoretic display of claim 6, wherein the solar cell is an organic solar cell, a polycrystalline silicon solar cell, a microcrystalline silicon solar cell, or a copper indium gallium selenium solar cell.

9. The electrophoretic display of claim 1, wherein the display panel comprises a plurality of pixels, and each of the plurality of pixels comprises the plurality of first electrophoretic particles and the plurality of second electrophoretic particles;
the driving circuit comprises a gate driver, a source driver, and a timing controller;
the timing controller is electrically connected to the gate driver and the source driver, and is configured to control the gate driver to sequentially turn on each of the plurality of pixels and output data signals to the source driver;
the gate driver is electrically connected to the display panel, and is configured to sequentially turn on each of the plurality of pixels under the control of the timing controller;
the source driver is electrically connected to the display panel, and is configured to apply the data signals to the plurality of pixels turned on by the gate driver under the control of the timing controller;
wherein the data signals comprise the balanced signal, the mixed signal, and the driving signal.

10. The electrophoretic display of claim 9, wherein the plurality of first electrophoretic particles and the plurality of second electrophoretic particles comprise white electrophoretic particles and black electrophoretic particles.

11. The electrophoretic display of claim 10, wherein the display panel further comprises a plurality of third electrophoretic particles, and during the mixing period, the plurality of third electrophoretic particles and the plurality of first electrophoretic particles and the plurality of second electrophoretic particles are uniformly dispersed; and
the plurality of first electrophoretic particles, the plurality of second electrophoretic particles, and the plurality of third electrophoretic particles comprise black electrophoretic particles, white electrophoretic particles, and colored electrophoretic particles.

12. The electrophoretic display of claim 11, wherein the colored electrophoretic particles are red electrophoretic particles or yellow electrophoretic particles.

13. A method for driving an electrophoretic display comprising a display panel and a driving circuit electrically connected to the display panel, the display panel comprising an electrophoretic solution, a plurality of first electrophoretic particles, and a plurality of second electrophoretic particles, the plurality of first electrophoretic particles and the plurality of second electrophoretic particles having different colors and being in the electrophoretic solution; the method for driving the electrophoretic display comprising:
providing a balance signal to the display panel during a balance period to balance residual charges accumulated in the display panel;
providing a mixed signal to the display panel during a mixing period to allow the plurality of first electrophoretic particles and the plurality of second electrophoretic particles dispersed in the electrophoretic solution; and
providing a driving signal during a coloring period to drive the plurality of first electrophoretic particles to a display side of the display panel;
wherein the balance period, the mixing period, and the coloring period are sequential in time, a preset time interval is between the balance period and the mixing period, or between the mixing period and the coloring period, or between the balance period and the mixing period and between the mixing period and the coloring period, the driving circuit is configured to drive the display panel in a segmented image brushing manner, and the method for driving the electrophoretic display further comprises restarting the driving circuit after the preset time interval to switch from one period to another.

14. The method for driving the electrophoretic display of claim 13, wherein the balance signal is a square wave.

15. The method for driving the electrophoretic display of claim 13, wherein the mixed signal comprises a plurality of positive pulse signals and a plurality of negative pulse signals, each of the plurality of positive pulse signals alternates with one of the plurality of negative pulse signals, and an amplitude of each of the plurality of positive pulse signals is equal to an amplitude of each of the plurality of negative pulse signals.

16. The method for driving the electrophoretic display of claim 13, wherein the driving signal comprises a plurality of first driving pulses and a plurality of second driving pulses, each of the plurality of first driving pulses alternates with one of the plurality of second driving pulses, the plurality of first driving pulses is negative pulse signals, the plurality of second driving pulses is positive pulse signals, and an amplitude of each of the plurality of first driving pulse is greater than an amplitude of each of the plurality of second driving pulses.

\* \* \* \* \*